INVENTOR.
JAMES OUYE
GEORGE RODRIGUEZ
ATTORNEYS

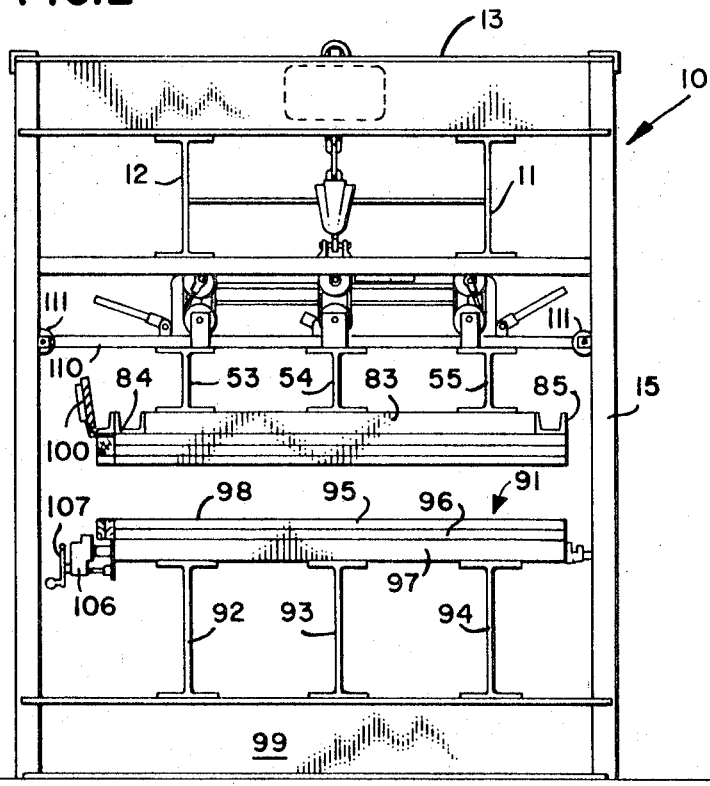

INVENTOR.
JAMES OUYE
GEORGE RODRIGUEZ
BY
ATTORNEYS

United States Patent Office 3,463,080
Patented Aug. 26, 1969

3,463,080
PLASTIC LAMINATING PRESS
George Rodriguez and James Ouye, both of 1365 Rollins Road, Burlingame, Calif. 94010
Filed Feb. 12, 1968, Ser. No. 704,751
Int. Cl. B30b 1/34, 15/34; B27d 3/00
U.S. Cl. 100—257
9 Claims

ABSTRACT OF THE DISCLOSURE

A press adapted for cementing plastic or the like to a base of wood or the like provided with a table on which the work to be cemented is placed. A pressure plate adapted to be lowered onto the top of the work by suitable hoists attached to the top of the press frame. The pressure plate is attached to several longitudinally disposed rigid beams and rows of hydraulic jacks, which are interconnected by a hydraulic pressure line, are attached to the top surfaces of these beams. Each jack is provided with a small pump so that when the pump of a selected jack is operated fluid pressure is supplied thereto and also through the pressure line to the other jacks and uniform pressure is applied by the pressure plate to the work surface. The pressure plate is also provided with an electrical heating element and heat may be applied to the work during the cementing operation. One side of the pressure plate is also provided with a hinged pressure member which is adapted to be pressed against the edge of the work by suitable clamps attached to the table so that curved surfaces may be cemented to the side of the work.

---

This invention relates to presses adapted for cementing sheets of plastic or the like to bases of wood or like material.

An object of this invention is to provide an improved press for cementing sheet material, for example, plastic sheets of relatively large areas, to surfaces of base material to form panels which may be used as table tops, counter tops and the like.

Another object of this invention is to provide an improved press for cementing thin material, for example, plastic or the like, to the top of wood bases of relatively large area to be used for table tops, counter tops and the like, said press being provided with a plurality of hydraulic jacks which are interconnected by a pressure line and which are arranged to apply pressure to a plate positioned on the plastic surface so that substantially uniform pressure is applied to the entire surface of the plastic pressing it to the wood base during the cementing operation.

Still another object of this invention is to provide an improved plastic press for cementing relatively large areas of plastic to suitable wood bases for use as table tops or the like, said press being provided with a relatively rigid frame with a table mounted on longitudinally extending rigid members and a pressure plate also provided with longitudinally extending rigid members attached to the top thereof and provided with rows of interconnected hydraulic jacks which are manually controlled from a selected jack and which apply uniform pressure to the pressure plate when the plate is lowered onto the work positioned on the table.

Still another object of this invention is to provide an improved plastic press for cementing relatively large areas of plastic to bases made of wood or the like, the press being provided with a pressure plaet, and hoisting means for raising the pressure plate from the top of the work supporting table to permit the work to be placed on the table, said press also being provided with several longitudinally extending rigid members attached to the top of the pressure plate and having rows of hydraulic jacks attached thereto for applying substantially uniform pressure to all areas of the pressure plate when the plate is brought down onto the plastic which is to be cemented to the base.

Other and further objects of this invention will be apparent to those skilled in the art to which it relates from the following specification, claims and drawing, in which, briefly:

FIG. 2 is an end view of the press showing the pressure plate in elevated position above the table;

FIG. 3 is a detail view showing the construction of the main and side pressure plates;

Figure 1:
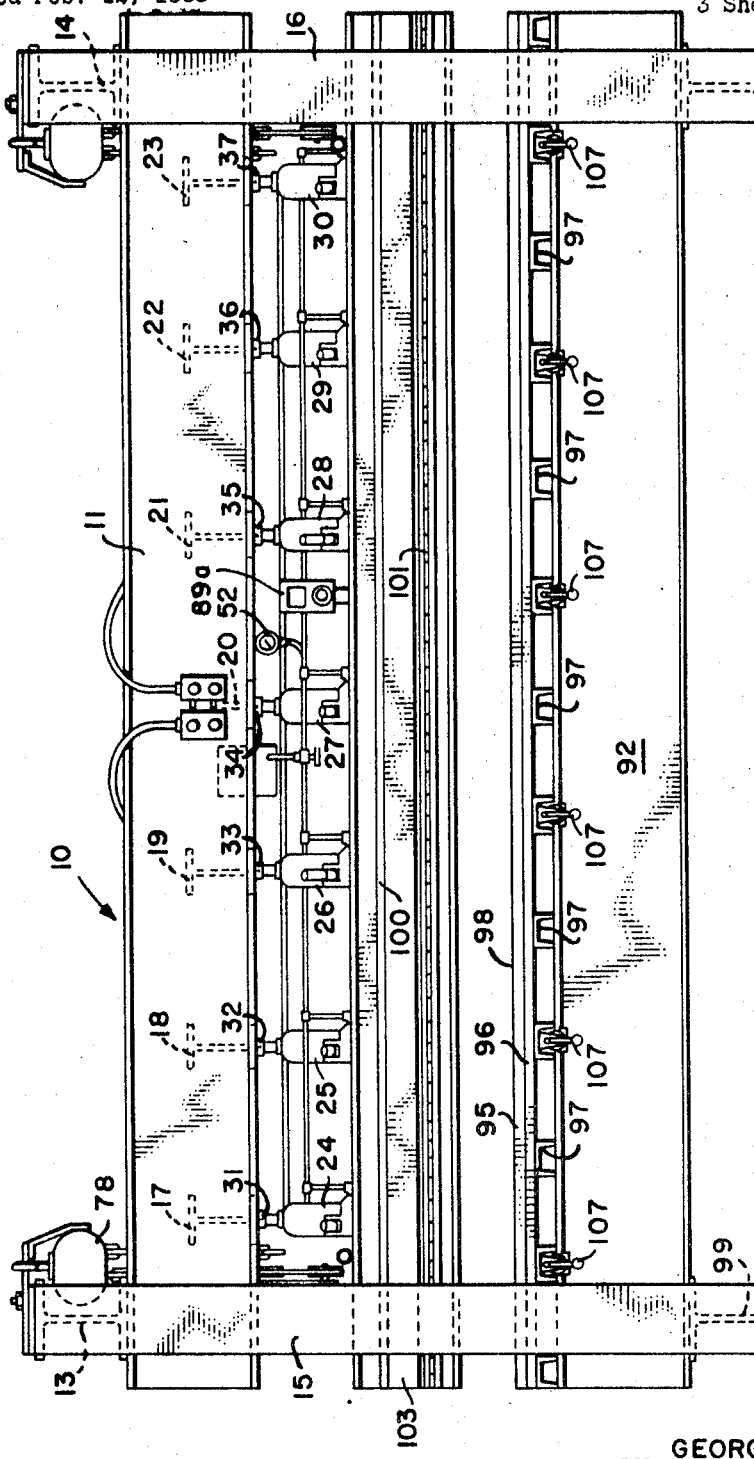
FIG. 1 is a side view of the press of this invention.

Referring to the drawing in detail, reference numeral 10 designates the frame structure of this plastic laminating press. This frame structure includes two substantially parallel upper I-beams 11 and 12, the ends of which are attached by welding or the like to the end members 13 and 14 which are also I-beams. Vertical channel members, such as the members 15 and 16 shown in FIG. 1, are attached by welding or the like to the ends of the I-beams 13 and 14 to form the corner members of the frame structure 10. Several small I-beams 17 to 23, inclusive, are positioned between the relatively large I-beams 11 and 12 and are welded thereto.

A row of jacks 24 to 30, inclusive, is positioned underneath the I-beam 11 and the upper ends of the piston rods 31 to 37, inclusive, thereof are attached to the bottom surface of this I-beam. A similar row of jacks is provided under the I-beam 12 and a third row of jacks is positioned between the aforesaid rows which are attached to beams 11 and 12. This third row of jacks is positioned under the crossing I-beams 17 to 23, inclusive, and the upper ends of the piston rods thereof are attached to the bottom surfaces of these crossing I-beams. All of these jacks are of the hydraulic type such as shown in FIG. 5.

Figure 5:
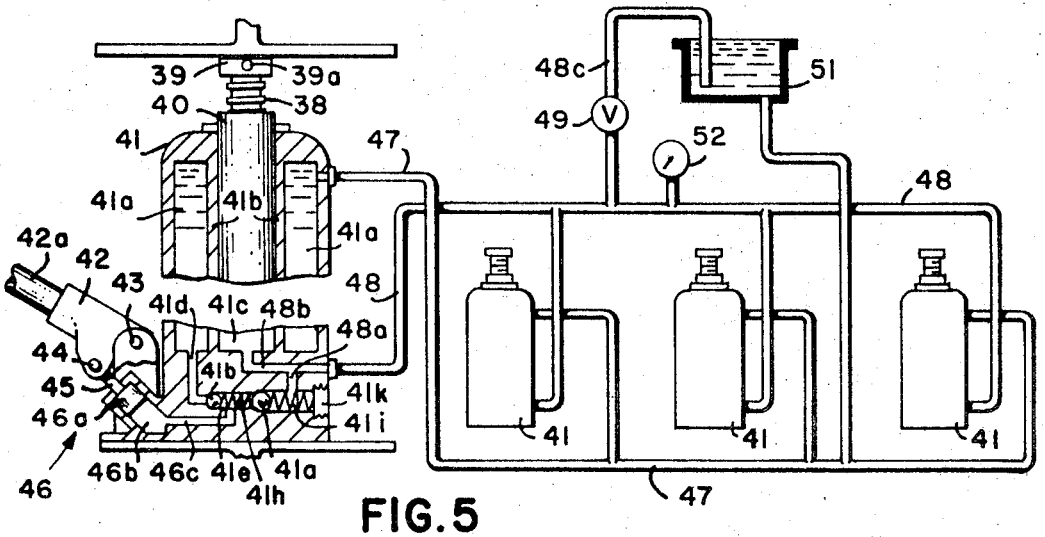
FIG. 5 is a detail view showing one of the jacks employed in this press.

Each of the jacks is provided with a threaded piston rod, such as the rod 38 shown in FIG. 5, the upper end of which is provided with a collar 39 which is attached thereto by a set screw 39a and which is attached to the lower surface of the associated I-beam by welding or the like. The rod 38 is threaded into the piston 40 which is slidable in the cylinder cavity provided to the jack body 41. Thus, by loosening the set screw 39, the rod 38 may be rotated and adjusted with respect to the piston 40.

Each jack is also provided with a socket lever 42 for receiving a manually operable lever 42a. The socket lever 42 is pivotally attached to the body of the jack by the pivot pin 43. An additional pivot pin 44 is provided to the level for pivotally attaching to the rod 45 of the small pump 46. Each jack is provided with a cavity 41a, as shown in FIG. 5, which functions as a reservoir and which is connected by the line 47 to the bottom of the main reservoir 51. Suitable fluid such as oil is provided to the reservoir 51 and this reservoir is positioned at a higher elevation with respect to the tops of the jacks so that fluid flows through line 47 to the cavities 41a in the jacks by gravity. It will be noted that reservoir line 47 is connected to the jacks close to the tops thereof. Each jack is also provided with an inner wall 41b which forms the cylinder cavity 41c for the piston 40.

The pump 46 is provided with a piston 46a which is slidable in the cylinder 46b formed in the lower part of the jack body. The jack reservoir 41a is connected by the bore 41d to the check valve cavity 41e which is provided with seating surfaces for seating the check valve balls 41f and 41g. Coil spring 41h is located between the balls 41f and 41g and coil spring 41i is located between the ball 41g and the plug 41k which is threaded into the end of the bore. It will be noted that the check valve ball 41g is approximately twice the diameter of the check valve ball 41f. The check valve cavity 41e between the balls 41f and 41g is connected to the pump cylinder 46b by the bore 46c. The annular jack reservoir 41a is connected by the bore 41d to the left hand end of the check valve cavity 41e adjacent to the seat for the check valve ball 41f. The check valve cavity 41e is also connected by the bore 48a to the pressure line 48. The bore 48a enters the check valve cavity 41e to the right of the check valve ball 41g. The pressure line is also connected to the jack cylinder 41c by the bore 48b.

By operating the pump of a selected jack, fluid is drawn into the pump cylinder 46b from the jack reservoir 46a through the bore 41d, check valve 41f, cavity 41e and bore 46c, inasmuch as the check valve ball 41f is lifted by suction away from its seat against the spring pressure of spring 41h during the outward stroke of the pump piston 46a. As fluid is drawn from the jack reservoir 41a by the pump 46, additional fluid flows into this jack reservoir from the main reservoir 51 through the tube 47. During the inward stroke of the pump 46 the piston 46a is moved further into the cylinder 46b and fluid is forced therefrom through the bore 46c into the check valve cavity 41e and lifts the check valve ball 41g from its seat so that fluid is pressed through the bore 48a into the pressure line 48 to the jacks connected to this pressure line, and also at the same time, fluid under pressure is forced through the bore 48b into the cylinder cavity 41c. Thus, uniform pressure is applied against the pistons in all of the jacks by operating one or more pumps of selected jacks.

Pressure line 48 is also connected by an auxiliary line 48c to the reservoir 51. A manually operated needle valve 49 is connected in this auxiliary line 48c. Needle valve 49 is normally closed but it is manually opened when it is desired to remove pressure from the jack pistons so that pressure is released from the top of the main pressure plate so that this pressure plate may be raised from the work by the hoists. A pressure gauge 52 is connected to the pressure line 48 to indicate the hydraulic pressure therein.

Three I-beams 53, 54 and 55 extending over the length of this apparatus are provided thereto and the upper surfaces of these I-beams are attached to the bottom plates of the jacks. Thus, the outer rows of jacks are positioned on and attached to the outer I-beams 53 and 55 by welding, suitable bolts or the like, and the jacks of the inner row are positioned on and attached to the upper surface of the intermediate I-beam 54.

The end parts of I-beams 53, 54 and 55 are attached to suitable lifting apparatus which will now be described. Each end of the I-beams 53, 54 and 55 is provided with a pair of pulleys. Thus, pulleys 56 and 57 are pivotally supported by the pin 59 on the bracket 58 which is attached by welding or the like to one end of I-beam 53, and a similar pulley arrangement is attached to the other end of this I-beam. Pulleys 60 and 61 are pivotally supported by pin 63 on the bracket 62 which is attached by welding or the like to one end of the I-beam 54 and a similar pulley arrangement is attached to the other end of this I-beam. Pulleys 64 and 65 are pivotally supported by the pin 67 on bracket 66 which is attached by welding or the like to one end of the I-beam 55, and a similar pulley arrangement is attached to the other end of this I-beam. Each end of the I-beams 11 and 12 is also provided with a pulley. Thus, one end of I-beam 12 is provided with a pulley 68 which is pivotally supported by the pin 69 on bracket 70 which is attached by welding or the like to the bottom of I-beam 12, and pulley 71 is supported by pivot pin 72 on the bracket 73 which is welded to the bottom surface of I-beam 11.

Figure 4:
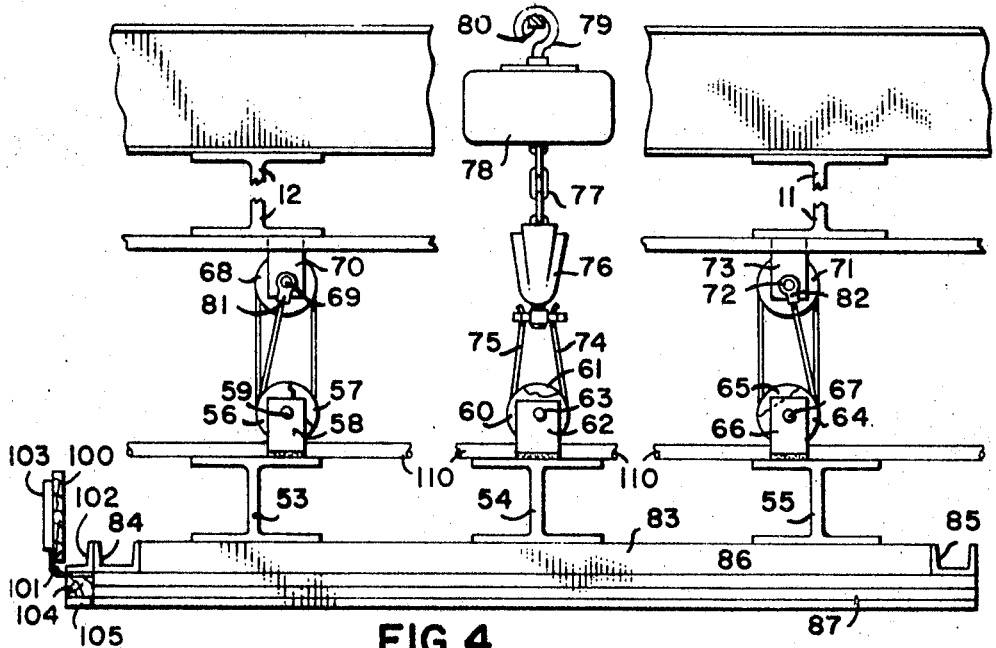
FIG. 4 is an end view showing the hoist position at one end of the press for raising the pressure plate.

This apparatus is provided with two electrically driven hoists such as shown in FIG. 4, and these hoists are positioned at the ends of the apparatus as shown in FIG. 1. Each hoist is provided with a pair of flexible wire cables 74 and 75, one end of each cable being attached to the member 76. The member 76 is attached to the hoist chain 77. These hoists are of conventional construction and the chain 77 thereof is adapted to be raised or lowered by the hoist motor 78, which is supported on the frame member 80 by the hook 79. Cable 74 is directed around pulley 60 and around pulley 57 up to pulley 68. From pulley 68 the cable is directed down to pulley 56 and around this pulley up to the anchoring member 81 which is attached to the bracket 70. In a similar manner the cable 75 is directed around pulley 61 over to pulley 65. From pulley 65 cable 75 is directed to pulley 71 and around this pulley down to the pulley 64 from which it is directed upward to the anchor member 82 which anchors it to the bracket 73. The other end of this apparatus is provided with a similar hoist and when the motors of the two hoists are energized, I-beams 53, 54 and 55 and the associated structure are raised.

Figure 6:
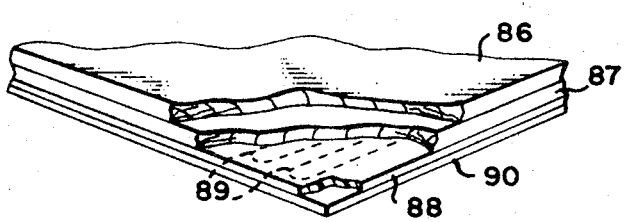
FIG. 6 is a detail view showing a fragment of the pressure plate partially broken away to show the heating element positioned therein.

The structure associated with I-beams 53, 54 and 55 includes a plurality of crossing channel members 83 which are attached to the bottom surfaces of the I-beams 53, 54 and 55 by welding or the like. The ends of channel members 83 are attached by welding or the like to the side channel members 84 and 85. All of the channel members 83, 84 and 85 are bolted to two slabs of mineral spacers 86 and 87 which may be of the type sold by Johns-Manville Company under the name Marinite 36. A relatively thin plastic board 88, which may be made of material such as Bakelite, is positioned under the mineral slab 87 and the electric heating element 89 of nichrome wire or the like is positioned between the board 88 and the slab 87, as shown in FIG. 6. The aluminum plate 90 is positioned under the board 88. The slabs 86 and 87, heating element 89, plastic board 88 and metal plate 90 are all held assembled with the channel members 83, 84 and 85 by suitable bolts extending therethrough so that this assembly forms the upper pressure plate of this apparatus. A suitable thermocouple or other heat responsive device (not shown) of conventional construction is positioned in slabs 86–87 and this device is connected to the thermostatic device 89a which is also of conventional construction and which controls the electric current flow to the heating element 89 to prevent overheating of the main pressure plate.

The table 91, which is supported on the I-beams 92, 93 and 94 is similar in construction to the pressure plate in that it is provided with two slabs of mineral spacers 95 and 96 which are supported on the cross channel members 97. A plurality of these cross channel members 97 is provided and these are attached to the top surfaces of the I-beams 92, 93 and 94 by welding. The top surface of the table 91 may be a board 98 of pressed wood, such as "Masonite" or the like, which may be removed and a new board substituted after it becomes worn, and this board, together with the mineral spacers 95 and 96, is bolted to the cross channels 97. The bottom surfaces of the end parts of I-beams 92, 93 and 94 are attached by welding or the like to end members, such as the end member 99 shown in FIG. 2, which forms part of the frame 10. The corner members, for example, the vertical members 15 and 16 shown in FIG. 1, of the frame 10 are attached by welding or the like to the ends of these end members.

A side pressure member 100 is supported by a long hinge or a plurality of small hinges 101 on the angle 102 which is bolted to the side channel 84. This side pressure member is provided for the purpose of applying pressure to one side of the plastic work piece which is being cemented to a wood base, as shown in FIG. 3, when it is desired that this side portion be curved around the edge of the wood base to provide a finished surface thereto. In order to press this curved plastic surface against the upper side of the wood base, there is provided a resilient pressure member 105 which may be made of rubber or the like and which is supported by the elongated member 104 under the angle 102 by bolts, screws or the like. The side pressure member 100 is provided with a plate 103 which may be of aluminum or the like, and this plate may be heated by a suitable heating element which is electrically insulated from it and which is supported by the pressure member 100.

Selected channel members 7 which support the table of this apparatus also support clamping devices 106 on one of the ends thereof. These clamping devices are adapted to press the side pressure member 100 against the side of the work. Several of the clamping devices 106 are provided to the side of this apparatus, as shown in FIG. 1. Each of these clamping devices is provided with a manually rotatable handle 107 attached to the outer end of the threaded rod 108. The jaw 109 of the clamping device is slidable on the supporting rod 109a and the inner end of the threaded rod 108, which is threaded into the support 109a, engages the jaw 109 and presses it against the pressure plate 100. Thus, when the main pressure plate is lowered down upon the work positioned on the table, the side pressure member 100 is turned downward so that the free edge thereof is positioned behind the clamping jaws 109. The jaw of each clamping device 106 is then brought against the outside of the side pressure member which is pressed against the side of the work during the cementing thereof.

Suitable guide rods 110 are attached to the end parts of the I-beams 53, 54 and 55. Thus, two of these guide rods are provided to this apparatus, one at each end of the I-beams 53, 54 and 55. Rollers 111 are rotatably supported on the ends of each of the guide rods 110 and these rollers are adapted to engage the inside surfaces of the corner channel members, such as the members 15 and 16 which form the corners of the frame 10 of this apparatus.

In the operation of this apparatus the wood base and plastic surface which are to be cemented together are positioned on the table with the plastic surface facing upward. Suitable cement is applied between the plastic and the wood base before these are assembled. This cement may be of various conventional types, either of the cold set or hot set, as desired. The main pressure member is then lowered by gravity onto the top of the plastic by operating the hoists attached to the top ends of the apparatus. If the plastic is provided with a curved side which is also to be cemented to the wood base, then the side pressure member is lowered to engage the side of the plastic and this side pressure member is clamped into the engagement with the side portions of the plastic by the clamps supported alongside of the table, as previously described. Pressure is then applied to the main pressure plate by manually giving the pump at the selected jack a few short strokes and the pressure gauge associated with the pressure line of the jacks is observed while operating the pressure pump of the selected jack so that the pressure applied to the work does not exceed a predetermined amount which may be on the order of 3000 pounds per square inch. If the work is properly arranged on the table, then a few short strokes is all that is necessary to obtain this pressure. If the cement employed for attaching the plastic to the wood base requires heating to properly set, then the heating element positioned in the pressure plate is energized to produce the desired temperature by supplying it with a suitable source of current supply which may be of conventional voltages employed for such purposes.

After the plastic is cemented to the wood base, the hydraulic pressure in the jacks is released by manually opening the needle valve 49a which is connected between the pressure line 48 and the reservoir line 48a, as shown in FIG. 5, so that the hydraulic pressure from line 48 is released into the reservoir 51 and the main pressure plate may then be raised from the work on the table by operating the hoists.

What we claim is:

1. In a press adapted for cementing veneer, plastic, or the like to a base of wood or the like, the combination comprising a frame, a table for receiving and supporting a work piece that is to be cemented, said frame having members supporting said table on the lower part thereof, a pressure plate positioned over said table, means lifting said pressure plate above said table, means attaching said lifting means to the top part of said frame, said pressure plate being adapted to be lowered upon the work on said table by said lifting means, a plurality of jacks positioned over said pressure plate, means attaching the upper parts of said jacks to said frame, means attaching the lower parts of said jacks to said pressure plate, manually operable means associated with selected ones of said jacks for applying pressure to said pressure plate and to the work on said table when said pressure plate is lowered to the top of the work.

2. In a press adapted for cementing veneer, plastic, or the like to a base of wood or the like, the combination as set forth in claim 1, further characterized in that said means attaching said jacks to said pressure plate comprises a first set of rigid members attached to the top of said pressure plate, said jacks being arranged in rows on said rigid members and said lower parts of said jacks being permanently attached to said rigid members.

3. In a press adapted for cementing veneer, plastic, or the like to a base of wood or the like, the combination as set forth in claim 2, further characterized in that said frame comprises a second set of rigid members and said jacks each include a piston and a piston rod and said means attaching the upper parts of said jacks to said frame comprise means attaching the piston rods of said jacks to said second set of rigid members.

4. In a press adapted for cementing veneer, plastic, or the like to a base of wood or the like, the combination as set forth in claim 3, further characterized in that the piston rods of said jacks are threaded into the pistons of said jacks and the lengths that said rods extend from said pistons are adjustable after said rods are detached from said second set of rigid members.

5. In a press adapted for cementing veneer, plastic, or the like to a base of wood or the like, the combination as set forth in claim 1, further characterized in that said manually operable means comprises a pump, an hydraulic pressure line connected to all of said jacks and to said pump so that operating said pump supplies hydraulic pressure to all of said jacks.

6. In a press adapted for cementing plastic or the like to a base of wood or the like, the combination as set forth in claim 5 further characterized in that each of said jacks includes a piston, a piston rod and a cylinder for slidably receiving said piston so that when said pressure plate is lowered to the work on said table by said lifting means said pistons are adapted to be withdrawn from the respective cylinders by the amount that said pressure plate is lowered.

7. In a press adapted for cementing plastic or the like to a base of wood or the like, the combination as set forth in claim 6 further characterized in that said pump is connected to a fluid reservoir by a fluid supply pipe, and a fluid pressure line connected between said pump and the cylinders of all of said jacks whereby operating said pump supplies fluid pressure to all of said cylinders so that uniform pressure is applied by all of said jacks to the said pressure plate.

8. In a press adapted for cementing plastic or the like to a base of wood or the like, the combination as set forth in claim 6 further characterized in that said jacks are each provided with a reservoir and all of said jack reservoirs are connected by a hydraulic line to a main reservoir, said main reservoir being elevated with respect to said jack reservoirs so that said jack reservoirs are filled with fluid from said reservoir when said pressure plate is lowered to the work.

9. In a press adapted for cementing plastic or the like to a base of wood or the like, the combination as set forth in claim 1, further characterized in that said pressure plate is provided with an auxiliary pressure plate, means pivotally supporting said auxiliary pressure plate on one side of said first mentioned pressure plate and means attached to said table clamping said auxiliary pressure plate to a side of the work supported on said table when said pressure plates are lowered to engage said work.

References Cited

UNITED STATES PATENTS 3,012,601  12/1961  Lee _____ 100—93 XR
3,168,034  2/1965  McClocklin et al. _ 100—257 XR BILLY J. WILHITE, Primary Examiner U.S. Cl. X.R.

100—93, 269, 278, 295; 144—281; 156—583